(12) United States Patent
Humburg et al.

(10) Patent No.: US 11,524,552 B2
(45) Date of Patent: Dec. 13, 2022

(54) VEHICLE HEATER

(71) Applicant: Eberspächer Climate Control Systems GmbH & Co. KG, Esslingen (DE)

(72) Inventors: Michael Humburg, Göppingen (DE); Hans Jensen, Dettingen unter Teck (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 832 days.

(21) Appl. No.: 15/975,086

(22) Filed: May 9, 2018

(65) Prior Publication Data
US 2018/0326815 A1 Nov. 15, 2018

(30) Foreign Application Priority Data
May 10, 2017 (DE) ...................... 10 2017 110 018.0

(51) Int. Cl.
| | |
|---|---|
| *B60H 1/22* | (2006.01) |
| *F04D 29/66* | (2006.01) |
| *F04D 23/00* | (2006.01) |
| *F23D 3/40* | (2006.01) |
| *F24H 9/00* | (2022.01) |
| *F24H 3/06* | (2022.01) |
| *F04D 25/06* | (2006.01) |

(52) U.S. Cl.
CPC ......... *B60H 1/2212* (2013.01); *F04D 23/008* (2013.01); *F04D 25/06* (2013.01); *F04D 29/663* (2013.01); *F04D 29/664* (2013.01); *F04D 29/665* (2013.01); *F23D 3/40* (2013.01); *F24H 3/065* (2013.01); *F24H 9/0063* (2013.01); *B60H 2001/2271* (2013.01); *B60H 2001/2281* (2013.01); *F05D 2250/51* (2013.01)

(58) Field of Classification Search
USPC ...................................... 237/12.3 c
See application file for complete search history.

(56) References Cited

U.S. PATENT DOCUMENTS

| | | | |
|---|---|---|---|
| 4,923,033 A * | 5/1990 | Panick | B60H 1/2212 126/116 R |
| 5,603,601 A * | 2/1997 | Winkelstroter | F04D 23/008 137/271 |

(Continued)

FOREIGN PATENT DOCUMENTS

| | | |
|---|---|---|
| CN | 200993071 Y | 12/2007 |
| CN | 201149271 Y | 11/2008 |

(Continued)

*Primary Examiner* — Steven B McAllister
*Assistant Examiner* — John E Bargero
(74) *Attorney, Agent, or Firm* — McGlew and Tuttle, P.C.

(57) ABSTRACT

A vehicle heater includes a heater housing (12'), through which heating air to be heated can flow, with a heating air inlet area and with a heating air outlet area. A burner unit is arranged in the heater housing. A combustion air blower (46') is arranged in the heater housing for delivering combustion air to the burner unit. A heat exchanger unit is arranged in the heater housing (12'). Heating air flowing through the heater housing (12') can flow around the heat exchanger unit. A combustion air intake muffler (76) is arranged essentially in the heater housing (12'). A muffler housing (78) made in one piece with the heater housing (12') is associated with the combustion air blower (46').

18 Claims, 6 Drawing Sheets

(56) References Cited

U.S. PATENT DOCUMENTS

2014/0037469 A1\* 2/2014 Humburg .............. F04D 29/664
   417/352
2014/9003746 2/2014 Humburg

FOREIGN PATENT DOCUMENTS

| | | |
|---|---|---|
| CN | 101879852 A | 11/2010 |
| CN | 103573718 A | 2/2014 |
| CN | 205330774 U | 6/2016 |
| DE | 28 56 860 A1 | 7/1980 |
| DE | 10 2004 048481 B3 | 2/2006 |
| DE | 20 2004 015 442 U1 | 2/2006 |
| DE | 10009820 B4 | 5/2010 |
| DE | 10 2012 213598 B3 | 11/2013 |
| EP | 3 252 315 A1 | 12/2017 |
| JP | 2002 332988 A | 11/2002 |
| KR | 20110135590 A | 12/2011 |

\* cited by examiner (State of the Art)

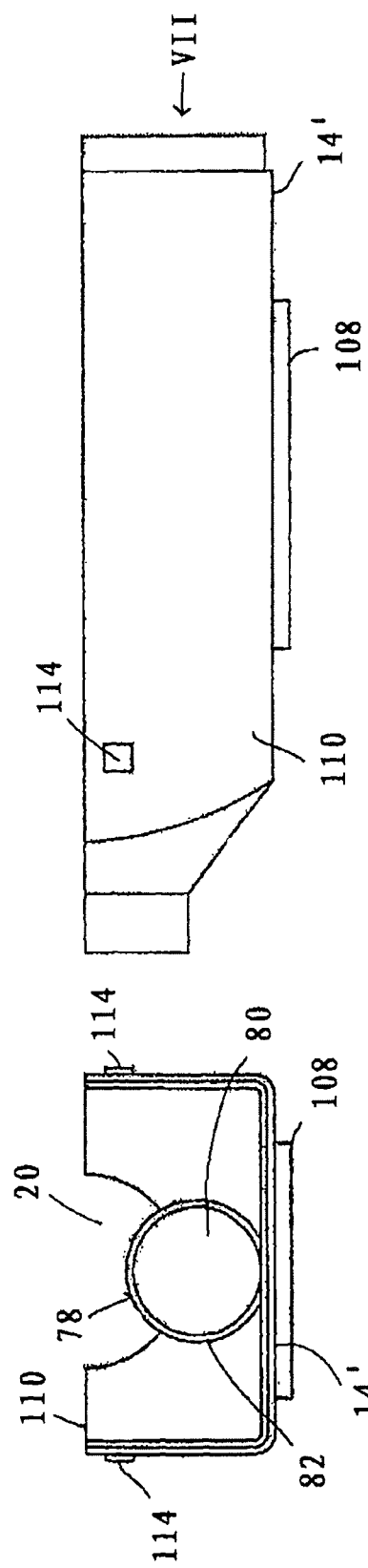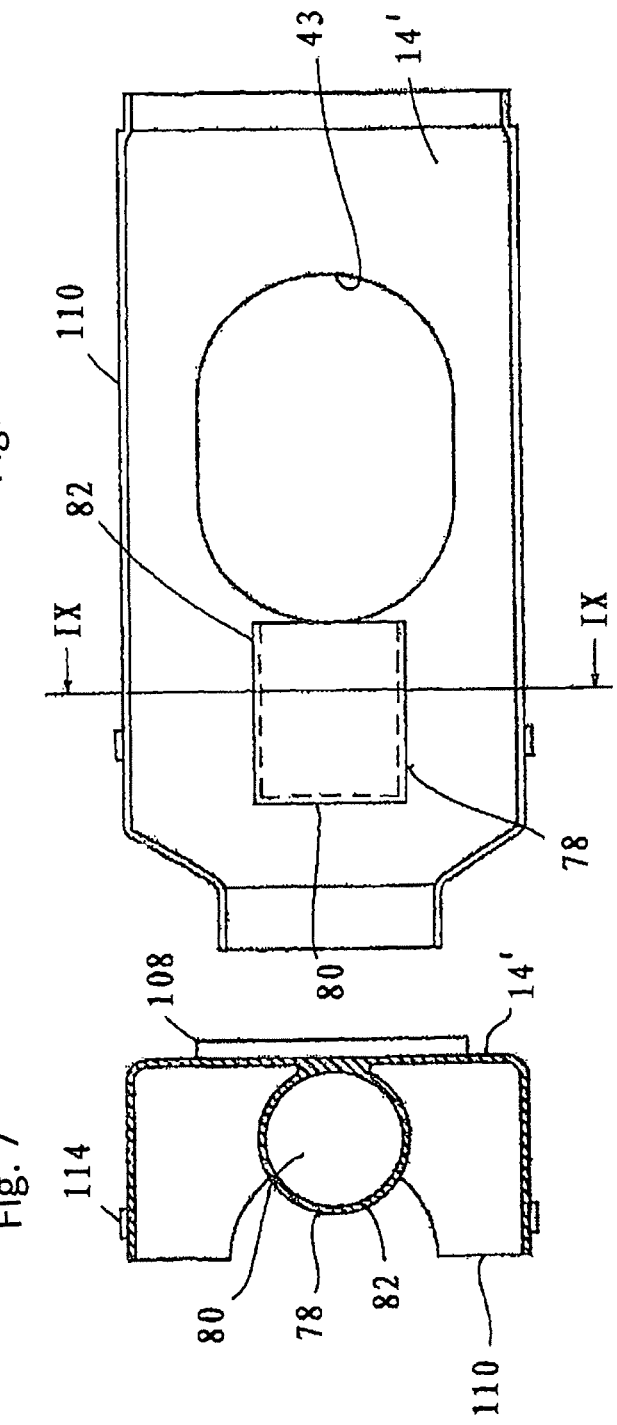

VEHICLE HEATER

CROSS REFERENCE TO RELATED APPLICATIONS

This application claims the benefit of priority under 35 U.S.C. § 119 of German Application 10 2017 110 018.0, filed May 10, 2017, the entire contents of which are incorporated herein by reference.

FIELD OF THE INVENTION

The present invention pertains to a vehicle heater, which can be used to heat heating air to be introduced into the interior of a vehicle.

BACKGROUND OF THE INVENTION

Such a vehicle heater is known from DE 20 2004 015 442 U1. A burner unit, a combustion air blower delivering combustion air to the burner unit, and a heat exchanger unit are arranged in this vehicle heater in a heater housing, through which the heating air can flow. The heating air flowing through the heater housing flows around these system areas in a heating air flow space at the outer circumferential areas of these system areas and can absorb heat especially when flowing around the heat exchanger unit. The combustion air is sent via a combustion air inlet area to the combustion air blower. The combustion air inlet area comprises a combustion air inlet pipe, which extends outwardly away from the combustion air blower essentially radially in relation to a housing longitudinal axis of the heater housing and passes through a housing wall of the heater housing.

SUMMARY OF THE INVENTION

An object of the present invention is to provide a vehicle heater having a compact design and a combustion air blower therefor with reduced noise emission.

This object is accomplished according to the present invention by a vehicle heater, comprising
- a heater housing, through which heating air to be heated can flow and which extends in the direction of a housing longitudinal axis, with a heating air inlet area and with a heating air outlet area,
- a burner unit arranged in the heater housing,
- a combustion air blower arranged in the heater housing for delivering combustion air to the burner unit, and
- a heat exchanger unit, which is arranged in the heater housing and around which heating air flowing through the heater housing flows,
- wherein a combustion air intake muffler arranged essentially in the heater housing with a muffler housing made in one piece with the heater housing is associated with the combustion air blower.

Since a combustion air intake muffler is associated with the combustion air blower in the vehicle heater configured according to the present invention, the emission of noises generated especially in the area of the combustion air blower is substantially suppressed over the combustion air inlet area, and a compact and easy-to-manufacture design of the vehicle heater is obtained due to the integration of the combustion air intake muffler in the heater housing, so that attached parts can be eliminated, especially outside the heater housing.

To utilize the volume available in the heater housing, provisions may be made for the combustion air blower and the heat exchanger unit to be arranged in the heater housing essentially centrally in relation to a housing longitudinal axis and for heating air flowing through the heater housing in a heating air flow space surrounding the combustion air blower and the heat exchanger unit to flow around them, the combustion air blower and the heat exchanger unit in the heater housing, at their outer circumferential areas, wherein the combustion air intake muffler is arranged essentially in the heating air flow space.

It is proposed for a simple integration of system areas of the vehicle heater in the heater housing that the heater housing comprise two housing shells adjoining one another preferably essentially at right angles to the housing longitudinal axis and that the muffler housing be made in one piece with one of the housing shells. At least one housing shell and preferably both housing shells is/are preferably made of a plastic material. Manufacturing with a plastic material makes it possible in a simple manner to make the muffler housing in one piece, i.e., integrally with one of the housing shells of the heater housing.

To make it possible to guide the combustion air necessary for the combustion into the interior of the heater housing without, however, bringing about a mixing with the heating air flowing therein, it is proposed that the combustion air blower have a combustion air inlet area, which passes through a housing wall of the heater housing in the area of an opening formed in one of the housing shells and guides combustion air to the combustion air intake muffler. The combustion air inlet area may comprise a combustion air inlet pipe with a pipe longitudinal axis extending essentially at right angles to the housing longitudinal axis.

To establish a flow connection between the combustion air intake muffler and the combustion air blower, the muffler housing is configured such that it adjoins the opening on one of the housing shells, or/and that the muffler housing is open at one of the housing shells in the direction of the housing longitudinal axis or/and towards the opening.

In the vehicle heater according to the present invention, the combustion air blower may comprise:
- a blower body with a delivery duct, which extends in a ring-shaped manner about an axis of rotation and is open in a first axial direction on a first axial side of the blower body,
- a combustion air delivery wheel located opposite the blower body on the first axial side thereof with a ring-shaped delivery area covering the delivery duct with a plurality of delivery blades following one another about the blower axis in the circumferential direction,
- a blower motor arranged on a second axial side of the blower body opposite the first axial side of the blower body with a motor shaft rotatable about the axis of rotation, wherein the motor shaft is coupled with the combustion air delivery wheel for joint rotation about the axis of rotation, and
- a delivery duct inlet area open to the delivery duct in the blower body for the entry of combustion air into the delivery duct,
- wherein the combustion air intake muffler is arranged essentially on the second axial side of the blower body.

A radially compact construction, which can therefore easily be integrated in a heater housing, is obtained with the combustion air intake muffler provided on the second axial side.

To achieve a sufficiently long flow path of the combustion air, which is advantageous for good muffling characteristics, it is proposed that the combustion air intake muffler comprise a first muffler flow path guiding combustion air from a combustion air inlet area of the combustion air blower away from the second axial side of the blower body essentially in a second axial direction opposite the first axial direction and a second muffler flow path guiding combustion air essentially in the first axial direction towards the delivery duct inlet area.

Since the radial space available for installation is generally limited in a heating air blower, it is further proposed in the interest of a sufficiently long flow path of the combustion air in the combustion air intake muffler that the first muffler flow path and the second muffler flow path extend essentially parallel to the axis of rotation or/and that the first muffler flow path be arranged radially outside the second muffler flow path.

To guide the combustion air to be guided to the combustion air blower into the combustion air intake muffler, provisions may be made for the combustion air inlet area to comprise a combustion air inlet pipe configured preferably integrally with the blower body with a pipe longitudinal axis extending essentially at right angles to the axis of rotation, wherein a first combustion air flow-through opening adjoining the combustion air intake muffler and a second combustion air flow-through opening open to the delivery duct inlet area with a second opening axis oriented essentially parallel to the axis of rotation are provided in the blower body.

A simple and compact configuration can be guaranteed in this connection by the first combustion air flow-through opening and the second combustion air flow-through opening being formed in a flow-through opening attachment, which extends essentially in the second axial direction on the second axial side of the blower body and is made preferably integrally with the blower body.

To utilize the radial space generally available for installation in a vehicle heater efficiently, it is proposed that the first combustion air flow-through opening be arranged radially outside the second combustion air flow-through opening.

To achieve the desired muffling characteristic, muffling material may be arranged in the muffler housing.

It should be noted that in the sense of the present invention, such muffling material is, for example, a porous, foam-like or fibrous material, which has a higher muffling rate than, for example, the material, e.g., plastic material, of which the muffler housing itself is made.

The first muffler flow path and the second muffler flow path are preferably formed essentially in the muffler housing. This can be achieved in a simple manner by a muffling body made of a muffling material being arranged in the muffler housing, wherein the first muffler flow path and the second muffler flow path are formed in the muffling body.

A heating air delivery wheel coupled with the motor shaft for joint rotation about the axis of rotation may be provided in the heating air inlet area.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a lateral view of a housing shell of the heater housing shown in FIG. 5;

FIG. 7 is an axial view of the housing shell according to FIG. 6, viewed in the viewing direction VII in FIG. 6;

FIG. 8 is a top view of the housing shell according to FIG. 6 in viewing direction VIII in FIG. 6;

FIG. 9 is a cross-sectional view of the housing shell according to FIG. 8, taken along a line IX-IX in FIG. 8;

DESCRIPTION OF THE PREFERRED EMBODIMENTS

Figure 1:
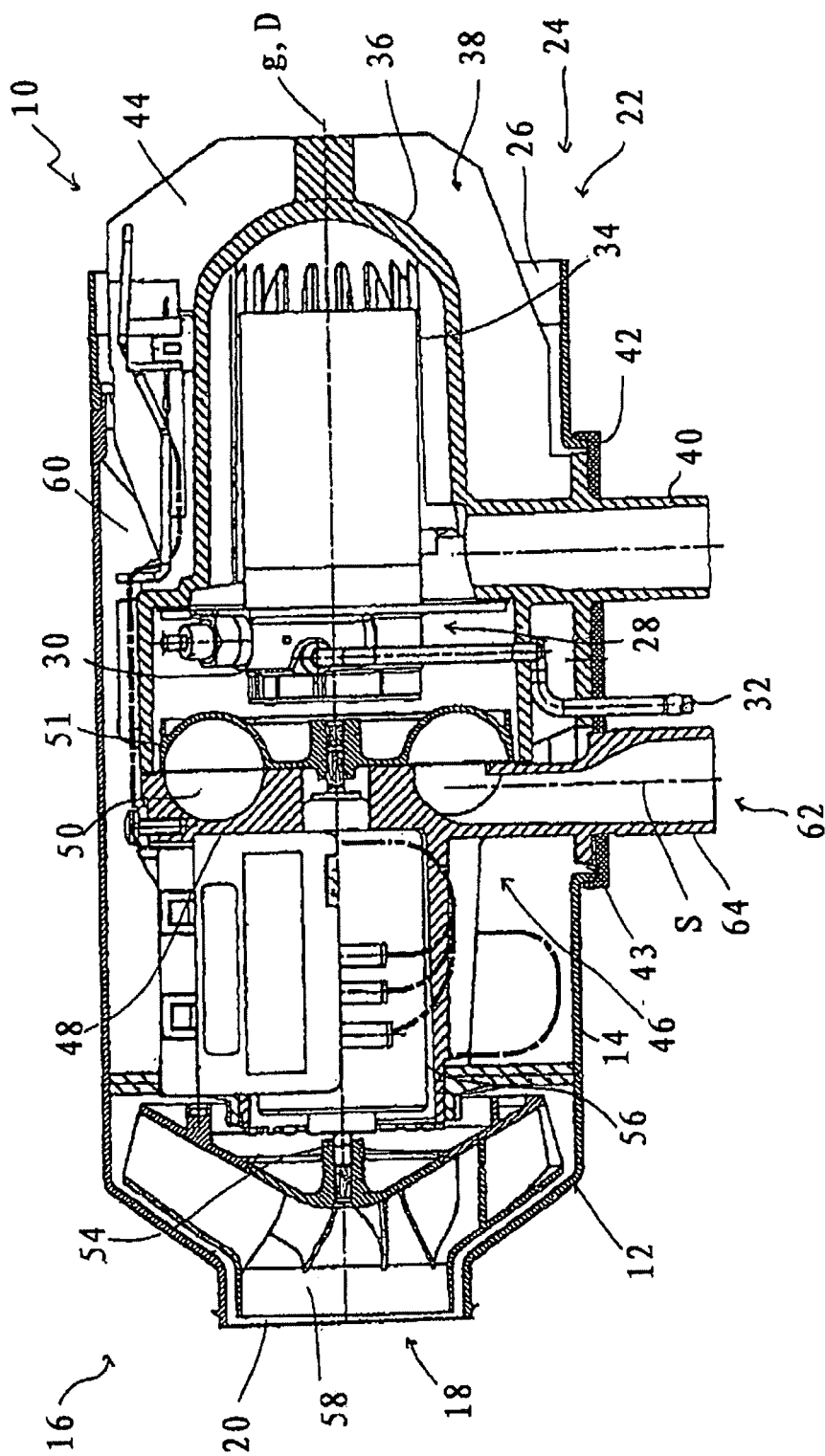
FIG. 1 is a longitudinal sectional view of a vehicle heater according to the state of the art.

Referring to the drawings, FIG. 1 shows a vehicle heater 10 known from DE 20 2004 015 442 U1 in the longitudinal section cut along a housing longitudinal axis G. Before the basic configuration of this vehicle heater 10 is explained below, it should be noted that features of this configuration may also be used in a vehicle heater 10' configured according to the present invention. The statements made below concerning the configuration of the vehicle heater 10 therefore also apply to some extent to the vehicle heater 10' configured according to the present invention.

The vehicle heater 10 comprises a heater housing generally designated by 12 with a housing wall 14 extending in the direction of the housing longitudinal axis G. A heating air inlet opening 20 that is preferably concentric to the housing longitudinal axis G is provided at an axial end area 16 of the heater housing 12. A heating air outlet area 24, with a heating air outlet opening 26 that is preferably concentric to the housing longitudinal axis G, is provided at the other axial end area 22 of the heater housing 12.

A burner unit generally designated by 28 is arranged in the interior of the heater housing 12. This burner unit 28 comprises a combustion chamber housing 30, in which combustion chamber housing 30, for example, a porous evaporator medium absorbing liquid fuel fed via a fuel feed line 32 may be provided. The liquid fuel absorbed in the porous evaporator medium is released in the direction of a combustion chamber and is burned there together with combustion air, so that the combustion waste gases generated in the process flow along a flame tube 34. The burner unit 28 is carried, together with the flame tube 34, on a housing 36 of a heat exchanger unit generally designated by 38. On an inner side of the housing 36, the combustion waste gases leaving the flame tube 34 flow in a direction of a waste gas outlet pipe 40, which passes through the housing wall 14 of the heater housing 12 or through a cover-like closing element 42 closing an opening 43 in the housing wall 14 essentially radially in relation to the housing longitudinal axis G. On a housing outer side, the housing 36 has a plurality of heat transfer ribs 44, around which heating air flowing in the direction of the heating air outlet area 24 can flow, and which can transfer heat to the heating air in the process.

Further, a combustion air blower, generally designated by 46, is provided in the heater housing 12. This combustion air blower 46, configured as a side channel blower, comprises a disk-like blower body 48, which has on an axial side an axially open delivery duct 50 surrounding the housing longitudinal axis G in a ring-shaped manner. A combustion air delivery wheel 52, which is coupled with a motor shaft 54 of a blower motor 56 for joint rotation with this about an axis of rotation D, which essentially corresponds, for example, to the housing longitudinal axis G or is parallel to same, is located opposite the delivery duct 50. Further, a heating air delivery wheel 58 arranged in the area of the heating air inlet area 18 is coupled with the motor shaft 54 of the blower motor 56 for joint rotation about the axis of rotation D. The blower motor 56 thus rotates both the combustion air delivery wheel 52 and the heating air delivery wheel 58 in order to guide combustion air in the direction of the burner unit 28, on the one hand, and to deliver heating air into a heating air flow space 60 formed in the heater housing 12, on the other hand. The heating air flowing through the heating air flow space 60, essentially in the direction of the housing longitudinal axis G, flows around the air blower 46 and the heat exchanger unit 38 on their respective outer sides and absorbs heat in the process especially while flowing around the housing 36 of the heat exchanger unit 38. The air leaves the heater housing 12 in a heated state at the heating air outlet area 22.

To feed the combustion air to the delivery duct 50, a combustion air inlet area 62, which comprises a combustion air inlet pipe 64 with a pipe longitudinal axis S extending essentially radially in relation to the axis of rotation D or the housing longitudinal axis G, is provided at the blower body 48 of the combustion air blower 46. The combustion air inlet pipe 64 passes through the opening 43 in the housing wall 14 and the closing element 42 and extends essentially radially through the heating air flow space 60. A line, for example, a flexible tube, may be connected to the combustion air inlet pipe 64 outside the heater housing 12.

Figure 3:
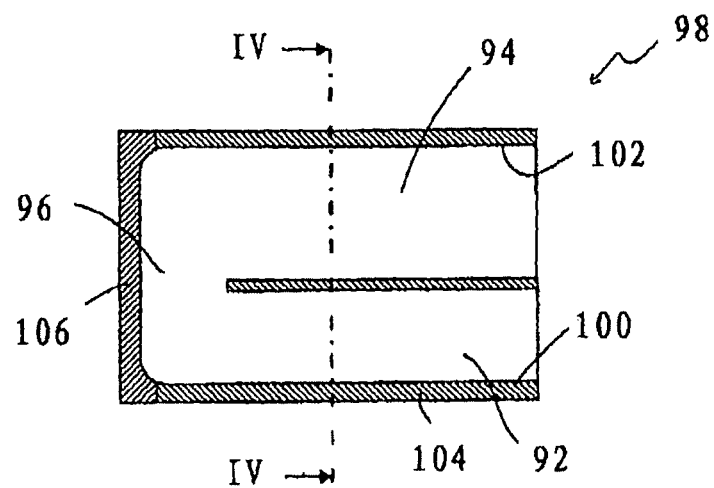
FIG. 3 is a longitudinal sectional view of a muffling body that can be used in the combustion air blower according to FIG. 2.
Figure 4:
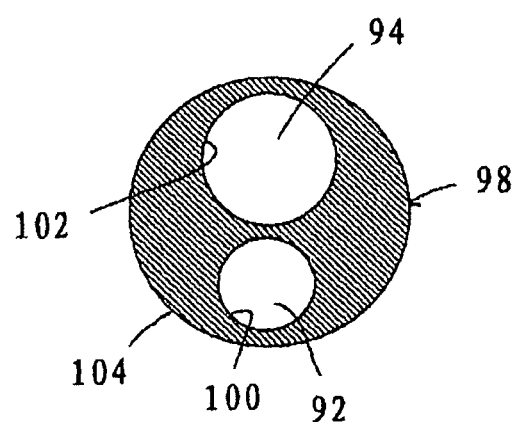
FIG. 4 is a cross-sectional view of the muffling body used in the combustion air blower according to FIG. 2, taken along a line IV-IV in FIG. 3.

A combustion air blower 10' configured according to the principles of the present invention, which can be used with features of the vehicle heater described above with reference to FIG. 1, will be described below with reference to FIGS. 2-4. Components or assembly units that correspond to components and assembly units described above with reference to FIG. 1 in terms of configuration and function are designated here by similar reference numbers, as they were used above with reference to FIG. 1, except they have a prime (') designation to indicate the component is part of a combustion air blower 46' according to the invention.

Figure 2:
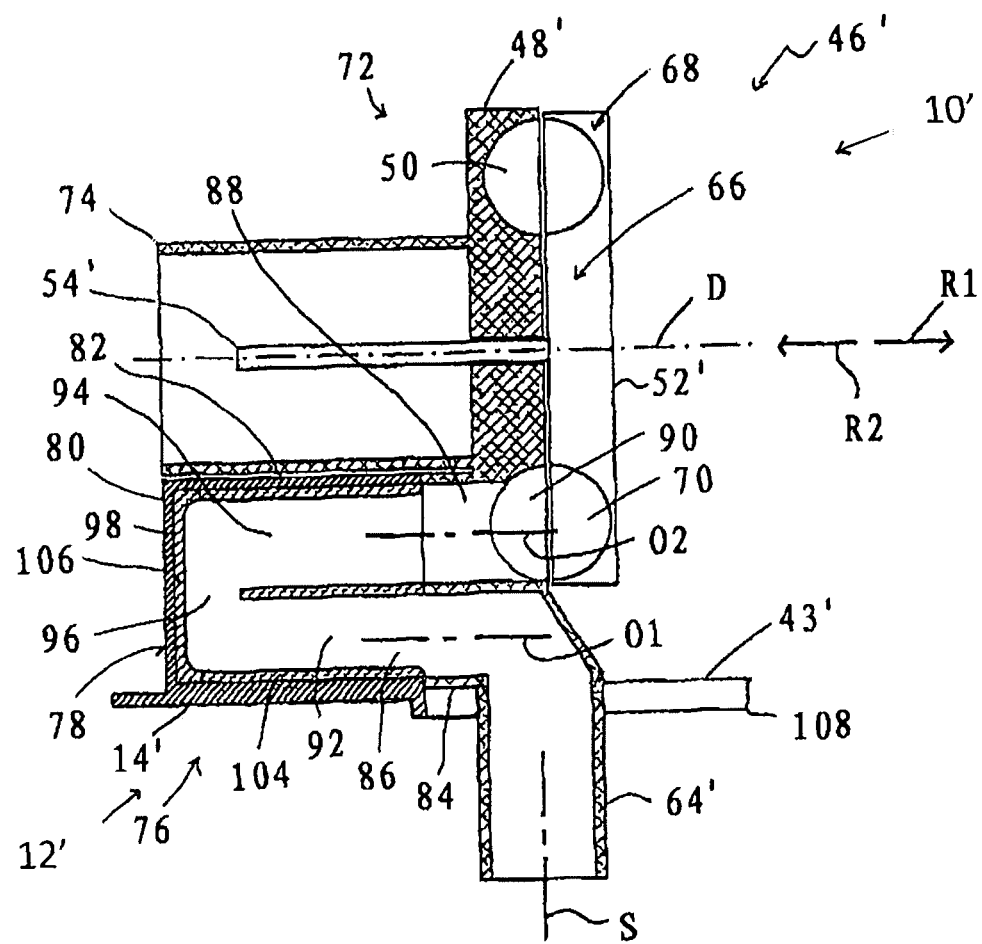
FIG. 2 is a longitudinal partial sectional view of a vehicle heater according to the invention, showing a combustion air blower that can be used with other features of the vehicle heater according to FIG. 1.

The combustion air blower 46' shown in FIG. 2 comprises the disk-like blower body 48', which is made of a metallic material and which has on a first axial side 66 a delivery duct 50', which is open in a first axial direction R1 and surrounds the axis of rotation D in a ring-shaped manner. A ring-shaped delivery area 68 of a combustion air delivery wheel 52' with a plurality of delivery blades 70 provided thereon is located axially opposite the delivery duct 50'. The motor shaft 54' passes through the blower body 48' and is coupled with the combustion air delivery wheel 52' for joint rotation about the axis of rotation D in its area projecting over said blower body on the first axial side.

On a second axial side 72 oriented opposite the first axial side 66, a motor housing 74 is provided, which is preferably configured integrally with the blower body 48' and extends in a second axial direction R2 oriented essentially opposite the first axial direction R1. The blower motor 56 shown in FIG. 1 can be mounted in the motor housing 74.

A combustion air intake muffler generally designated by 76 is provided outside the motor housing 74. The combustion air intake muffler 76 comprises an essentially pot-shaped muffler housing 78 with a bottom wall 80 and with a muffler circumferential wall 82. The muffler housing 78 is arranged radially between the motor housing 74 and a housing wall 14' in relation to the housing longitudinal axis G and is made in one piece, i.e., integrally with this housing wall 14' or as a block of material therewith, in a muffler area adjoining the housing wall 14'.

With the muffler circumferential wall 82, the muffler housing 78 is arranged adjoining a flow-through opening attachment 84 made preferably integrally with the blower body 48' and may be fixed to same. A first combustion air flow-through opening 86 and a second combustion air flow-through opening 88 with opening axes O1, O2 that are essentially parallel to one another and to the axis of rotation D are formed in the flow-through opening attachment 84. A combustion air inlet pipe 64' made preferably integrally with the blower body 48' adjoins the first combustion air flow-through opening 86. This inlet pipe 64' has a longitudinal axis S oriented essentially at right angles to the opening axes O1, O2 and also to the axis of rotation D. The combustion air, which flows over the combustion air inlet pipe 64' essentially from the radially outside area into the radially inside area is deflected essentially by 90° in the transition area to the first combustion air flow-through opening 86 and flows essentially in the second axial direction R2 in and out of the first combustion air flow-through opening 86. The combustion air flows in the opposite direction in the second combustion air flow-through opening 88, i.e., essentially in the first axial direction R1, towards a delivery duct inlet area 90, via which the combustion air enters the ring-shaped delivery duct 50'. The two combustion air flow-through openings 86, 88 are preferably arranged in an essentially radially staggered manner, so that the first combustion air flow-through opening 86 is positioned radially outside the second combustion air flow-through opening 88 and also radially outside the delivery duct 50'.

In association with the two combustion air flow-through openings 86, 88, muffler flow paths 92, 94 are formed in the muffler housing 78 arranged axially adjoining the flow-through opening attachment 84. A first muffler flow path 92 extends here, adjoining the first combustion air flow-through opening 86, essentially in the direction of the opening axis O1, so that the combustion air entering the first muffler flow path 92 via the first combustion air flow-through opening 86 flows essentially in the second axial direction R2. In a deflection area 96, in which the second muffler flow path 94 adjoins the first muffler flow path 92, the combustion air is deflected by about 180°, so that the combustion air flows in the second muffler flow path 94 essentially in the first axial direction R1 towards the second air flow-through opening 88.

A muffling body 98 made of a muffling material is arranged in the muffler housing 78. The circumferential contour of the muffling body 98 is adapted to the inner contour of the muffler housing 78, so that this is in contact with an inner circumferential surface of the circumferential wall 82 and with an inner bottom surface of the bottom wall 80 and is held thereon. Openings 100, 102, which form the two muffler flow paths 92, 94 and are provided, for example, with a circular cross section each, are formed in the muffling body 98 shown in FIGS. 3 and 4. To provide the deflection area 96, the muffling body 96 may have a multipart configuration with an essentially cylindrically shaped body part 104 forming the openings 100, 102 and with a body part 106, which axially closes this body part 104 and provides essentially the deflection area 96. The muffling body 98 is preferably accommodated entirely in the muffler housing 78, so that no design measures need to be taken on the blower body 48' or on the flow-through opening attachment 84 to accommodate muffling material.

FIG. 2 also shows some sections of the housing wall 14' of the heater housing 12' with the opening 43' formed thereon in the area of a radially outwardly projecting collar 108, to which the element 42 can be fixed. It is seen that the combustion air blower 46' is arranged, together with the combustion air intake muffler 76, in the interior of the heater housing 12', especially in the heating air flow space 60, through which the heating air can flow. The combustion air inlet pipe 64' is oriented and also positioned in relation to the blower body 48' as in the case of the embodiment of the combustion air blower known from the state of the art and shown in FIG. 1. Since the muffler housing 78 with its pot-like structure, which housing is configured integrally with the housing wall 14', is arranged such that the muffler housing 78 is positioned in the direction of the housing longitudinal axis G and towards the opening 43' and is positioned such that it adjoins this opening 43' with an open area, the blower body 48' can be positioned with the flow-through opening attachment 84 made integrally therewith such that the flow-through opening attachment 84 directly adjoins the muffler housing 78 in the edge area of the opening 43', so that an essentially leak-free flow of combustion air is guaranteed. In this area, in which the muffler housing 78 adjoins the blower body 48', these components may be connected to one another by connection in substance, by connectors, for example, by bolts, or/and by plugging one into another. Mixing of the combustion air with heating air flowing in the heater housing 12' can be avoided in this manner.

Figure 5:
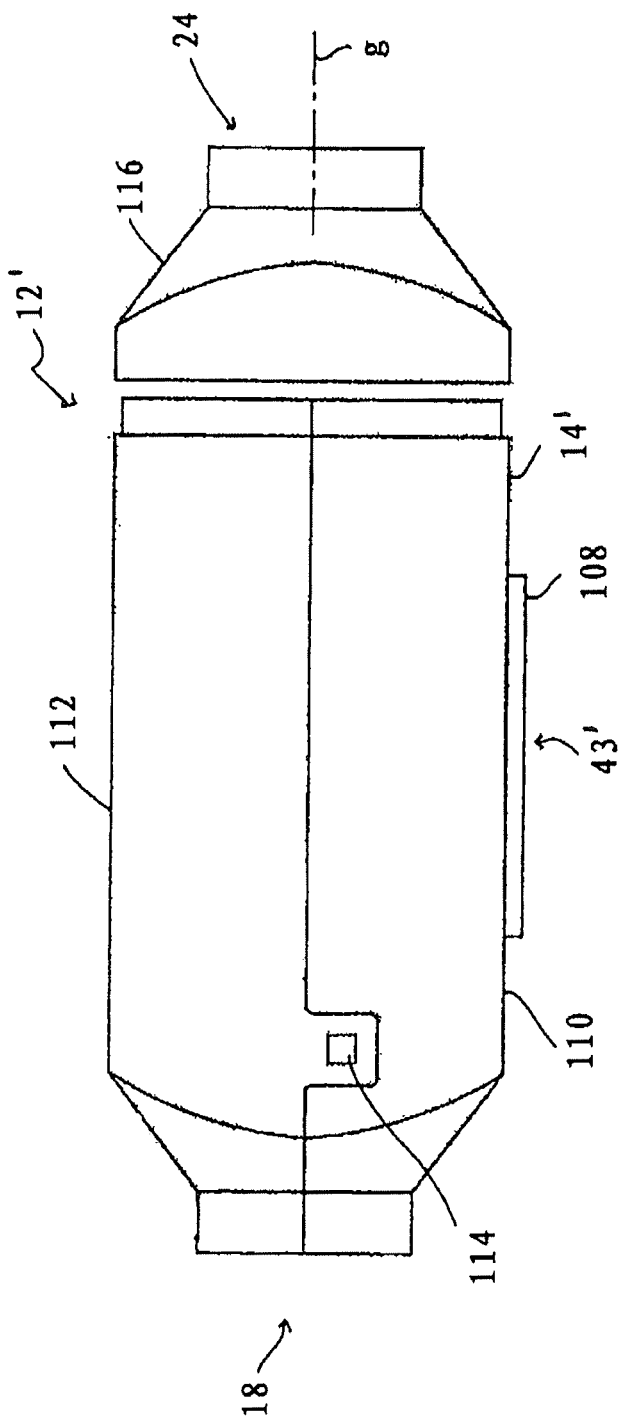
FIG. 5 is a lateral view of a heater housing.

FIG. 5 shows a heater housing 12', which can be used with features of the vehicle heater 10 shown in FIG. 1 to provide the vehicle heater 10' according to the invention. The heater housing 12' comprises two housing shells 110, 112, which are elongated in the direction of the housing longitudinal axis G and adjoin one another at right angles to the housing longitudinal axis G. These two housing shells 110, 112 may be connected by locking devices 114 meshing with one another. The two housing shells 110, 112 together form a heating air inlet area 18 a heating air inlet opening 20, such as shown in FIG. 1. The heating air outlet area 24 with the heating air outlet opening 26 is provided at a housing closing part 116, which is attached to the two housing shells 110, 112 in the direction of the housing longitudinal axis G or is plugged onto these two housing shells 110, 112.

FIGS. 7 through 9 show in more detail the housing shell 110 having the opening 43' and the collar 108 enclosing same. The housing shell 110 provides the housing wall 14', in the area of which the muffler housing 78 adjoins the heater housing 12' or with which the muffler housing 78 is made in one piece. It can clearly be seen in FIG. 8 that the muffler housing 78 with the circumferential wall 82 ends directly adjoining the opening 43' in the housing wall 14' and in the housing shell 110, so that, as is shown in FIG. 2, the blower body 48' of the air blower 46' can be positioned such that the blower body 48' directly adjoins the muffler housing 78 with the muffling body mounted therein.

This integral configuration of the housing shell 110 with the muffler housing 78 can be embodied in an especially simple manner by manufacturing the housing shell 110 from a plastic material. The other housing shell 112 and the housing closing part 116 may preferably also be manufactured from a plastic material.

Figure 10:
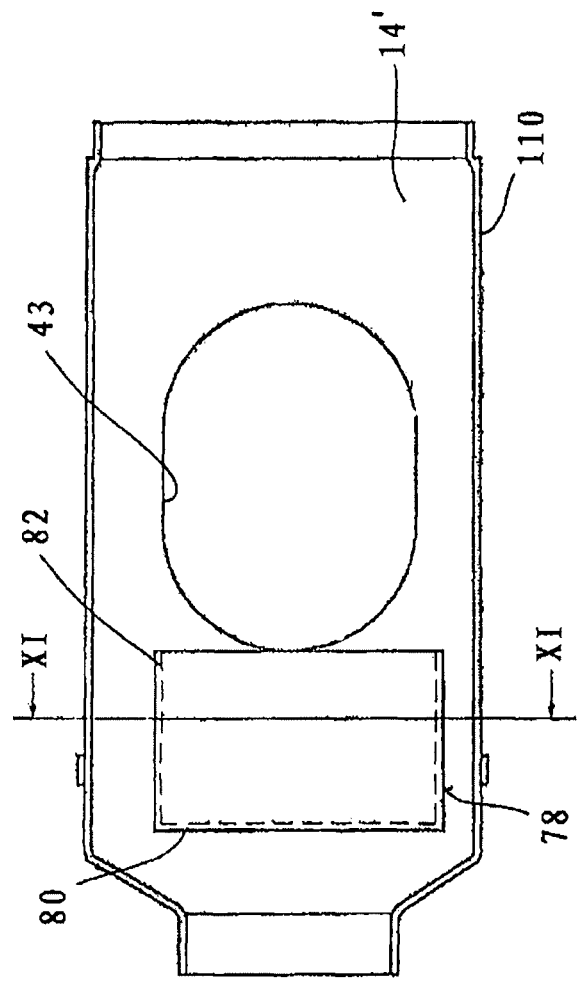
FIG. 10 is a view of an alternatively configured housing shell, which view corresponds to FIG. 8.
Figure 11:
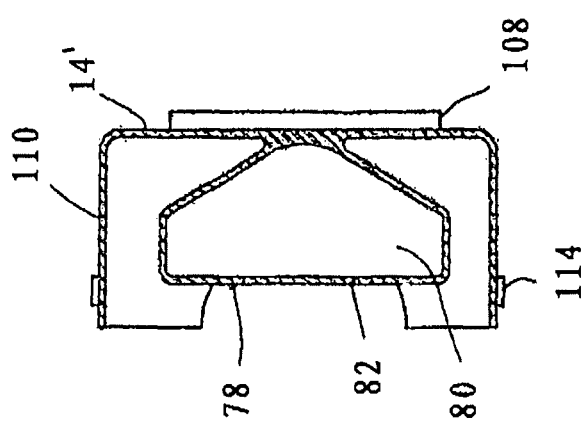
FIG. 11 is a cross-sectional view of the housing shell according to FIG. 10, taken along a line XI-XI in FIG. 8.

FIGS. 10 and 11 show an alternative embodiment of the housing shell 110 and of the muffler housing 78 made integrally in this. While the muffler housing 78 has an essentially circular cross-sectional geometry in the case of the configuration shown in FIGS. 6-9, the muffler housing 78 shown in FIGS. 10 and 11 is configured with an essentially flattened, for example, approximately pentagonal cross-sectional geometry. The muffler housing 78 thus has a markedly greater extension at right angles to the housing longitudinal axis G than in the above-described embodiment, so that more volume is formed for the muffler flow paths to be provided in it. It thus becomes possible to also provide these muffler flow paths with a larger cross section or/and to provide a multiply meandering structure of the muffler flow paths in order to achieve a further improvement in the muffling characteristic. This structure may be obtained, for example, corresponding to the embodiment of the muffling body to be inserted into the muffler housing 78.

The heater housing 12' may also have a different configuration than is shown in the figures, especially also in terms of the configuration of the two housing shells 110, 112. Thus, the separating line or separating plane between the two housing shells 110, 112 adjoining each other at right angles to the housing longitudinal axis G may be sloped to the housing longitudinal axis G or/and it may be curved. Further, the two housing shells 110, 112 do not have to have essentially equal dimensions, as it is shown in the figures. One of the two housing shells may have, for example, a cover-like configuration, while the other of the two housing shells may provide the essentially circumferential area of the heater housing 12'.

While specific embodiments of the invention have been shown and described in detail to illustrate the application of the principles of the invention, it will be understood that the invention may be embodied otherwise without departing from such principles.

What is claimed is:

1. A vehicle heater comprising:
   a heater housing through which heating air to be heated can flow and which heater housing extends in a direction of a housing longitudinal axis, the heater housing having a heating air inlet area and a heating air outlet area;
   a burner unit arranged in the heater housing;
   a combustion air blower arranged in the heater housing for delivering combustion air to the burner unit;
   a heat exchanger unit arranged in the heater housing and around which heating air flowing through the heater housing can flow; and
   a combustion air intake muffler arranged essentially in the heater housing and associated with the combustion air blower, wherein a muffler housing is made in one piece with at least a portion of the heater housing, wherein the combustion air blower comprises:

a blower body with a delivery duct, which has a ring-shaped extent about an axis of rotation and which is open in a first axial direction on a first axial side of the blower body;

a combustion air delivery wheel located opposite the blower body on the first axial side thereof with a ring-shaped delivery area covering the delivery duct and with a plurality of delivery blades following each other about the axis of rotation in a circumferential direction;

a blower motor arranged on a second axial side of the blower body, which second axial side is opposite the first axial side of the blower body, with a motor shaft rotatable about the axis of rotation, wherein the motor shaft is coupled with the combustion air delivery wheel for joint rotation about the axis of rotation; and a delivery duct inlet area open to the delivery duct in the blower body for the entry of combustion air into the delivery duct, wherein the combustion air intake muffler is arranged essentially on the second axial side of the blower body, wherein the combustion air intake muffler comprises:

a first muffler flow path guiding combustion air from a combustion air inlet area of the combustion air blower in a first axial direction;

a second muffler flow path guiding combustion air in a second axial direction toward a delivery duct inlet area of the combustion air blower, the second axial direction being opposite the first axial direction, wherein the first muffler flow path and the second muffler flow path extend parallel to an axis of rotation of a combustion air delivery wheel of the combustion air blower.

2. A vehicle heater in accordance with claim 1, wherein:
the combustion air blower and the heat exchanger unit are arranged in the heater housing essentially centrally in relation to the housing longitudinal axis;
heating air, flowing through the heater housing in a heating air flow space surrounding the combustion air blower and the heat exchanger unit, flows around the combustion air blower and the heat exchanger unit at outer circumferential areas thereof; and
the combustion air intake muffler is arranged essentially in the heating air flow space.

3. A vehicle heater in accordance with claim 1, wherein:
the heater housing comprises two housing shells adjoining each other essentially at right angles to the housing longitudinal axis; and
the muffler housing is made in one piece with one of the housing shells.

4. A vehicle heater in accordance with claim 3, wherein at least one housing shell is made of a plastic material.

5. A vehicle heater in accordance with claim 3, wherein the combustion air blower has a combustion air inlet area, which passes through a housing wall of the heater housing in an area of a housing opening formed in one of the housing shells and guides combustion air to the combustion air intake muffler.

6. A vehicle heater in accordance with claim 5, wherein the combustion air inlet area comprises a combustion air inlet pipe with a pipe longitudinal axis extending essentially at right angles to the housing longitudinal axis.

7. A vehicle heater in accordance with claim 5, wherein:
the muffler housing is configured such that the muffler housing adjoins the housing opening at one of the housing shells; or the muffler housing is open at one of the housing shells in a direction of the housing longitudinal axis; or
the muffler housing is open at one of the housing shells towards the housing opening; or
any combination of the muffler housing is configured such that the muffler housing adjoins the housing opening at one of the housing shells and the muffler housing is open at one of the housing shells in a direction of the housing longitudinal axis and the muffler housing is open at one of the housing shells towards the housing opening.

8. A vehicle heater in accordance with claim 1, wherein the combustion air intake muffler comprises:
a first muffler flow path guiding combustion air from a combustion air inlet area of the combustion air blower essentially in a second axial direction opposite the first axial direction away from the second axial side of the blower body;
a second muffler flow path guiding combustion air essentially in the first axial direction towards the second muffler flow path; and
the first muffler flow path and the second muffler flow path extend essentially parallel to the axis of rotation or the first muffler flow path is arranged radially outside the second muffler flow path; or the first muffler flow path and the second muffler flow path extend essentially parallel to the axis of rotation and the first muffler flow path is arranged radially outside the second muffler flow path.

9. A combustion air blower in accordance with claim 1, wherein:
the combustion air inlet area comprises a combustion air inlet pipe made integrally with the blower body and with a pipe longitudinal axis extending essentially at right angles to the axis of rotation;
a first combustion air flow-through opening is provided in the blower body and adjoins the combustion air inlet pipe with a first opening axis oriented essentially parallel to the axis of rotation;
a second combustion air flow-through opening is provided in the blower body and opens towards the delivery duct inlet area with a second opening axis oriented essentially parallel to the axis of rotation.

10. A vehicle heater in accordance with claim 9, wherein the first combustion air flow-through opening and the second combustion air flow-through opening are formed in a flow-through opening attachment, which extends essentially in the second axial direction on the second axial side of the blower body and is made integrally with the blower body.

11. A vehicle heater in accordance with claim 9, wherein the first combustion air flow-through opening is arranged radially outside the second combustion air flow-through opening.

12. A vehicle heater in accordance with claim 1, wherein the combustion air intake muffler comprises muffling material arranged in the muffler housing.

13. A vehicle heater in accordance with claim 8, wherein:
the combustion air intake muffler comprises muffling material arranged in the muffler housing; and
the first muffler flow path and the second muffler flow path are formed essentially in the muffler housing.

14. A vehicle heater in accordance with claim 13, wherein:
a muffler body made of the muffling material is arranged in the muffler housing;
the first muffler flow path and the second muffler flow path are formed in the muffler body.

15. A vehicle heater comprising:
a heater housing through which heating air to be heated can flow and which heater housing extends in a direction of a housing longitudinal axis, the heater housing having a heating air inlet area and a heating air outlet area;
a burner unit arranged in the heater housing;
a combustion air blower arranged in the heater housing for delivering combustion air to the burner unit;
a heat exchanger unit arranged in the heater housing and around which heating air flowing through the heater housing can flow; and
a combustion air intake muffler arranged, at least a portion of the combustion air intake muffler being arranged in the heater housing and associated with the combustion air blower, the combustion air intake muffler comprising a muffler housing, the muffler housing being integrally connected with at least a portion of the heater housing to form a one-piece muffler heater housing structure.

16. A vehicle heater in accordance with claim 15, wherein the combustion air intake muffler comprises:
a first muffler flow path guiding combustion air from a combustion air inlet area of the combustion air blower in a first axial direction;
a second muffler flow path guiding combustion air in a second axial direction toward a delivery duct inlet area of the combustion air blower, the second axial direction being opposite the first axial direction, wherein the first muffler flow path and the second muffler flow path extend parallel to an axis of rotation of a combustion air delivery wheel of the combustion air blower.

17. A vehicle heater in accordance with claim 16, wherein:
the combustion air blower and the heat exchanger unit are arranged in the heater housing essentially centrally in relation to the housing longitudinal axis;
heating air, flowing through the heater housing in a heating air flow space surrounding the combustion air blower and the heat exchanger unit, flows around the combustion air blower and the heat exchanger unit at outer circumferential areas thereof; and
the combustion air intake muffler is arranged essentially in the heating air flow space.

18. A vehicle heater comprising:
a heater housing through which heating air to be heated can flow and which heater housing extends in a direction of a housing longitudinal axis, the heater housing having a heating air inlet area and a heating air outlet area;
a burner unit arranged in the heater housing;
a combustion air blower arranged in the heater housing for delivering combustion air to the burner unit;
a heat exchanger unit arranged in the heater housing and around which heating air flowing through the heater housing can flow; and
a combustion air intake muffler arranged essentially in the heater housing and associated with the combustion air blower, wherein a muffler housing is made in one piece with at least a portion of the heater housing, wherein the heater housing comprises two housing shells adjoining each other essentially at right angles to the housing longitudinal axis, the muffler housing being made in one piece with one of the housing shells.

* * * * *